(12) United States Patent
Conrad et al.

(10) Patent No.: US 7,164,670 B2
(45) Date of Patent: Jan. 16, 2007

(54) METHOD FOR ASSIGNING INBOUND TRANSMISSIONS WITH MINIMAL SIGNALING OVERHEAD

(75) Inventors: Alan P. Conrad, St. Charles, IL (US); Bradley M. Hiben, Glen Ellyn, IL (US); Robert D. LoGalbo, Hoffman Estates, IL (US); Darrell J. Stogner, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 1001 days.

(21) Appl. No.: 10/166,836

(22) Filed: Jun. 11, 2002

(65) Prior Publication Data

US 2003/0227891 A1   Dec. 11, 2003

(51) Int. Cl.
H04B 7/212 (2006.01)
(52) U.S. Cl. .................................. 370/337; 370/345
(58) Field of Classification Search .............. 370/337, 370/345, 347, 348
See application file for complete search history.

(56) References Cited

U.S. PATENT DOCUMENTS

| 5,127,100 | A |   | 6/1992 | D'Amico et al. |
| 5,729,541 | A | * | 3/1998 | Hamalainen et al. ....... 370/337 |
| 5,790,527 | A |   | 8/1998 | Janky et al. |
| 5,818,823 | A |   | 10/1998 | Nakanishi |
| 6,075,794 | A |   | 6/2000 | Ohel |
| 6,094,429 | A |   | 7/2000 | Blanchette et al. |
| 6,614,773 | B1 |  | 9/2003 | Maxemchuk |
| 2003/0072295 | A1 | | 4/2003 | Maxemchuk |

* cited by examiner

Primary Examiner—Derrick W. Ferris

(57) ABSTRACT

In an outbound transmission (300), an address of a first subscriber unit assigned to transmit in a first inbound slot is identified. With one bit in the outbound transmission (300), an additional inbound slot the first subscriber unit is assigned to transmit is identified.

20 Claims, 3 Drawing Sheets

—PRIOR ART—

—PRIOR ART—

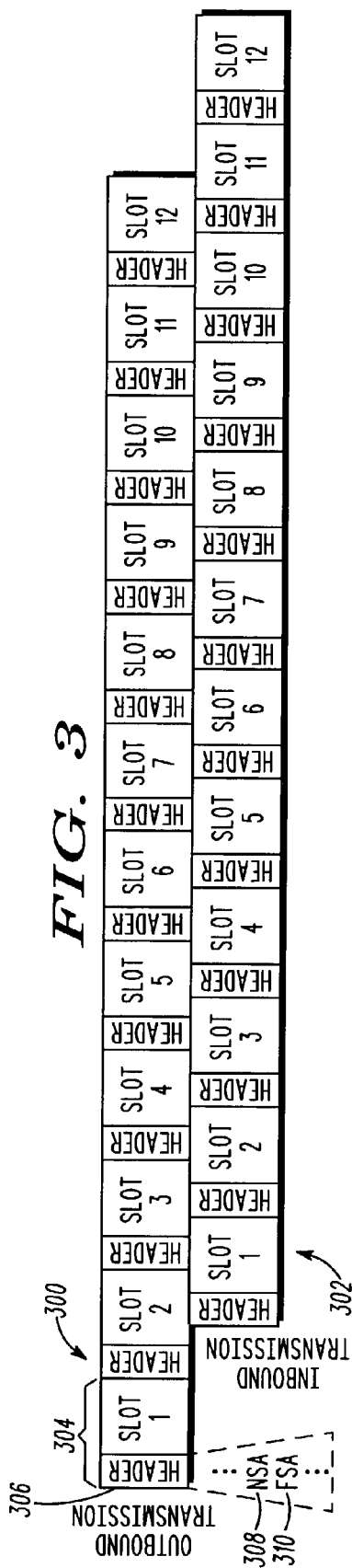

METHOD FOR ASSIGNING INBOUND TRANSMISSIONS WITH MINIMAL SIGNALING OVERHEAD

REFERENCE TO RELATED APPLICATION

The present application is related to U.S. Pat. No. 6,928,065, titled "Methods of Addressing and Signaling a Plurality of Subscriber Units in a Single Slot" by LoGalbo et al. which is commonly owned together with this application by Motorola, Inc.

FIELD OF THE INVENTION

The present invention relates generally to a method for assigning inbound transmission with minimal signaling overhead.

BACKGROUND OF THE INVENTION

In a time division multiple access system, inbound slot assignments can be made on each corresponding outbound slot. As shown in FIG. 1, outbound slot 1 would contain a subscriber assignment identifier that specifies the slot assignment of inbound slot 1. For a full duplex subscriber unit, all inbound slot assignments made on the outbound channel can be decoded even when transmitting on an inbound slot. A half duplex subscriber unit, however, cannot receive the outbound slot assignments made on outbound slots that are adjacent to the one it is transmitting inbound as shown in FIG. 2; the half duplex subscriber unit cannot fully utilize the inbound channel. In FIG. 2, a half duplex subscriber unit transmitting on inbound slot 1 cannot receive the slot assignments in the outbound slots marked "X". Slot assignments to the half duplex subscriber unit transmitting in slot 1, made in the outbound slots marked with an "X" will be missed, resulting in their corresponding inbound slots going unused; those outbound slots cannot contain data, including slot assignments for the transmitting half duplex subscriber unit. A problem with this method is that a half duplex subscriber unit can only use one in every three inbound slots, thus cutting the available throughput by two thirds.

Thus, there exists a need for a method that allows subscriber units, particularly half duplex subscriber units, to more effectively utilize the inbound channel.

BRIEF DESCRIPTION OF THE FIGURES

A preferred embodiment of the invention is now described, by way of example only, with reference to the accompanying figures in which:

FIG. 3 illustrates a radio frequency full duplex, time division multiplex system in accordance with the present invention;

FIG. 4 illustrates a table of example inbound slot assignments in accordance with the present invention;

DETAILED DESCRIPTION OF THE PREFERRED EMBODIMENT

Figure 1:
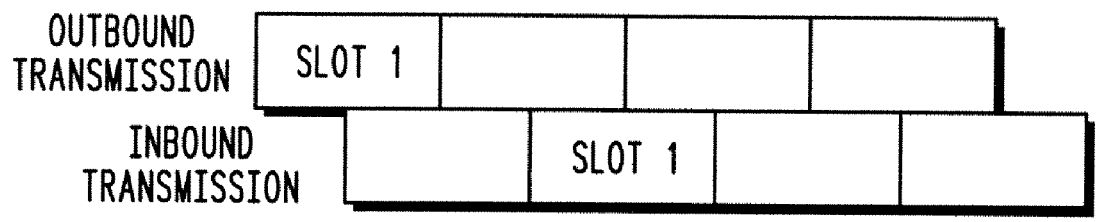
FIG. 1 (prior art) illustrates outbound time slot 1 with its corresponding inbound slot 1.
Figure 2:
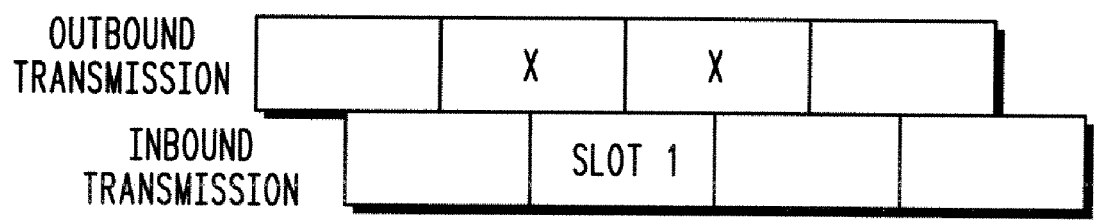
FIG. 2 (prior art) illustrates the outbound slots that a half duplex subscriber is unable to receive while transmitting on inbound slot 1.

The present invention provides a single system that can be utilized by both full and half duplex subscriber units. Such a system allows for high tier full duplex subscriber units to interoperate with low tier half duplex subscriber units without having separate infrastructures for full and half duplex subscriber units. Unlike some prior art, the present invention does not require the half duplex subscriber unit to receive every outbound (downlink) slot to learn of its slot assignments. The present invention provides a method for assigning inbound transmissions with minimal signaling overhead, thus allowing a half duplex subscriber unit to transmit in consecutive inbound (uplink) slots making more of the available inbound throughput usable to the subscriber unit; the present invention allows the half duplex subscriber unit to utilize more of the available throughput by providing future inbound slot assignments to half duplex subscriber units with minimal signaling overhead.

Turning to the figures, FIG. 3 illustrates outbound 300 and inbound 302 radio frequency ("RF") time division multiplex ("TDM") channels. The outbound channel 300 conveys information from the infrastructure to the subscriber unit(s); the inbound channel 302 conveys information from the subscriber unit(s) to the infrastructure. In the present invention, the infrastructure can be any device or equipment that provides at least the reference system clock (e.g., base station synchronized to a global positioning system receiver). Each channel 300, 302 comprises a stream of slots, wherein each slot 304 is a fixed duration. Each slot 304 comprises a slot header 306 and at least a slot signaling channel ("SSCH") and/or a packet data channel ("PDCH") communications paths (not shown). Peer-to-peer signaling and control messages are conveyed over the SSCH communications path. User plane data (e.g., IP packets) is conveyed over the PDCH communications path.

In accordance with the present invention, each outbound slot 304 comprises at least one field. The at least one field comprises information relating to at least a next slot assignment ("NSA") and a forward slot assignment ("FSA"). For ease of explanation and for clarification purposes only, the preferred embodiment of the present invention partitions this information, and other information, into separate fields: a NSA field 308, a slot type field (not shown), and a FSA field 310. In the preferred embodiment, this information resides in each slot header 306 of the outbound slots 304 and is used for inbound slot assignment signaling. The values associated with these fields apply only to the respective outbound slot; in other words, a portion or all of the values associated with these fields may differ from slot-to-slot on the outbound channel.

The NSA field 308 signals which subscriber unit may transmit on the corresponding inbound slot. When an address of a particular subscriber unit is not identified in the NSA field 308, any number of subscriber units, or possibly none at all, may transmit on the corresponding inbound slot, depending on the information in the slot type field (discussed below).

The slot type field indicates the inbound slot type; there may be multiple inbound slot types, all of which may be signaled in the slot header (e.g., reserved, random access, quiet, etc.). In the preferred embodiment, an amount of time dedicated to the transmission of one subscriber unit is referred to as a "reserved" time slot; an amount of time dedicated to the transmission of all subscriber units requiring access to the infrastructure is referred to as a "random access" slot type; an amount of time dedicated to no transmissions to the infrastructure is referred to as a "quiet" time slot.

The FSA field 310 provides an indication of upcoming inbound slots assigned to the subscriber unit indicated in the NSA field 308. In the preferred embodiment, the FSA field 310 is utilized as a bitmap where each bit represents a future slot assignment. A bit set to a one indicates that the corresponding inbound slot is assigned to the subscriber indicated by the NSA field 308; a cleared bit (i.e., a bit set to zero) indicates that the corresponding inbound slot is not assigned to the subscriber unit identified in the NSA field 308 and may not be transmitted on by the subscriber unit, unless the slot is a random access opportunity. It should be noted that in the preferred embodiment, in order for a bit in the FSA field 310 to be set to one, the slot type of the inbound slot in advance of the current corresponding slot has to be the same as the slot type indicated in the slot type field. In the preferred embodiment, the FSA field 310 comprises eight bits, however, any number of bits may be used. Each bit in the FSA field 310 represents one inbound slot in advance of the current corresponding inbound slot. Thus, in the preferred embodiment, the combination of the NSA field 308, the slot type, and the FSA field 310 provides scheduling up to nine consecutive inbound slots.

In the preferred embodiment, the least significant bit ("LSB"), b(0), of the FSA field 310 indicates whether the slot following the corresponding (or next) inbound slot is assigned to the subscriber specified in the NSA field 308 and that the slot is of the same type as that indicated in the slot type field. The next significant bit, b(1), of the FSA field 310 indicates whether the second slot following the corresponding inbound slot is assigned to the subscriber unit specified in the NSA field 308 and that the slot is of the same type as indicated in the slot type field. The remaining bits on the FSA field 310 follow in the same manner. The most significant bit, b(7), indicates whether the eighth slot following the corresponding inbound slot is assigned to the subscriber unit specified in the NSA field 308 and that the slot is of the same type as that indicated in the slot type field.

FIG. 4 illustrates a table of example inbound slot assignments in accordance with the present invention. As shown, the values in the inbound slot column 400 correspond to the inbound slot numbers shown in FIG. 3. The slot type column 402 indicates the inbound slot type (e.g., reserved, random access, quiet, etc.). The assigned unit column 404 indicates the subscriber unit addressed in the NSA field 308 for reserved access slots. For example, referring to the third row in the table 406, inbound slot three is a reserved access slot assigned to subscriber unit B; the eighth row in the table 408 indicates that inbound slot 8 is a random access slot, therefore not assigned to a particular subscriber unit.

Figure 5:
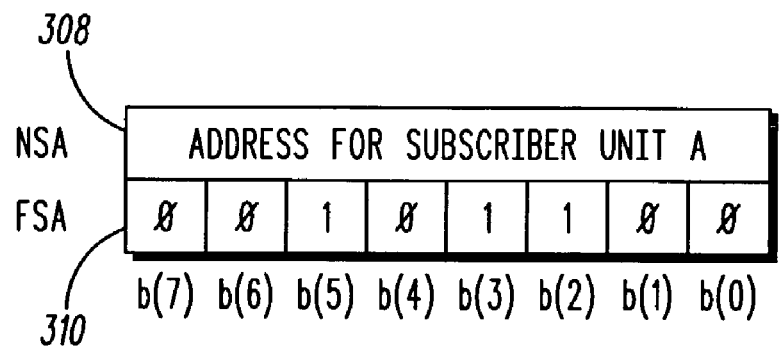
FIG. 5 illustrates an example of the representation of the inbound slot assignments for subscriber A from FIG. 4 in accordance with the present invention.
Figure 6:
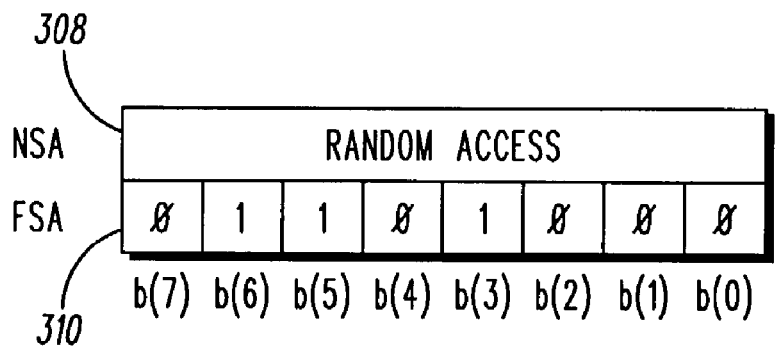
FIG. 6 illustrates an example of the representation of the random access opportunities from FIG. 4 in accordance with the present invention.
Figure 7:
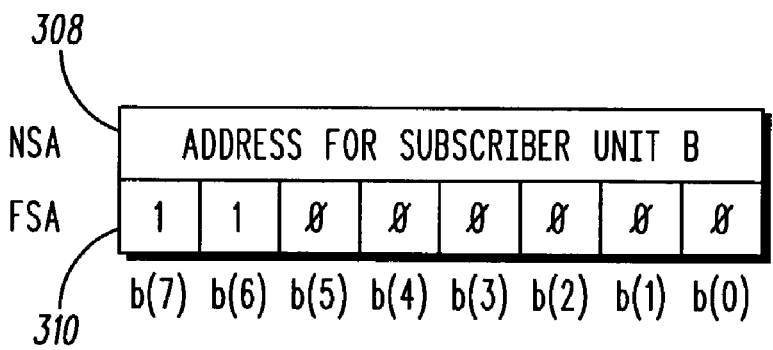
FIG. 7 illustrates an example of the representation of the inbound slot assignments for subscriber B from FIG. 4 in accordance with the present invention.

FIGS. 5, 6, 7 illustrate the addresses of the assigned subscriber unit in the NSA field 308 and the values in the FSA field 310 as they would appear in the first, second and third outbound slots represented in the table of FIG. 4. For example, FIG. 5 illustrates the NSA and FSA fields 308, 310 as they would appear in the outbound slot header 306 of slot 1. As shown in FIG. 4, the NSA field 308 and the slot type field within outbound slot 1 specify the slot assignment for inbound slot 1. The assigned unit to inbound slot 1 is subscriber unit A, thus the NSA field 308 contains the address of subscriber unit A. Inbound slot 2 is a "random access" opportunity for all subscriber units and thus is not a reserved access slot for subscriber unit A; as a result, the value of the LSB (b0) in the FSA field 310 is zero. Since inbound slot 3 is reserved for subscriber unit B, and not subscriber unit A, the value of the next significant bit (b1) is also zero. However, inbound slot 4 is reserved for subscriber unit A, and therefore the value of b(2) in the FSA field 310 is one. The same logic applies for all the bit values in the FSA field 310. Thus, the bit value in the FSA field 310 is a one if the inbound slot is reserved for the subscriber unit addressed in the NSA field 308 (and if the slot type field is used, the slot is preferably the same type as indicated in the slot type field); otherwise the bit value is a zero. By utilizing the FSA field 310 as described in the present invention, the half duplex subscriber unit is able to know that it can transmit on inbound slots 4, 5 and 7 without having to receive outbound slots 4, 5 and 7. Without the FSA field 310 of the present invention, the half duplex subscriber would be unable to transmit on inbound slot 5 because it would not be able to receive outbound slot 5 while transmitting on inbound slot 4, thus increasing the throughput of the inbound channel with minimal signaling.

Turning to FIG. 6, the NSA and FSA fields 308, 310 are shown, as they would appear in the outbound slot header of slot 2. Since there is not an assigned subscriber unit to inbound slot 2, the NSA field 308 indicates a "random access" opportunity for all subscriber units (typically all zeros are used, but any address may be assigned to "random access" opportunities); all subscriber units may transmit over inbound slots identified as "random access" opportunities, thus, there is no dedicated slot assignment to a particular subscriber unit on a "random access" opportunity. Since inbound slots 3, 4, 5, 7, 10 and 11 are reserved for a particular subscriber unit, the bits b(0), b(1), b(2), b(4) and b(7) in the FSA field 310 have a value of zero. Inbound slots 6, 8 and 9, however, are subsequent "random access" opportunity slots, and therefore bits b(3), b(5), and b(6) have a value of one in the FSA field 310.

FIG. 7 illustrates the NSA and FSA fields 308, 310 as they would appear in the outbound slot header 306 of slot 3. The assigned unit to inbound slot 3 is subscriber unit B, thus the NSA field 308 contains the address of subscriber unit B. Since within the next eight inbound slots, only inbound slots 10 and 11 are reserved for subscriber unit B, only bits b(6) and b(7) have a value of one in the FSA field 310.

Thus, by placing this additional field (i.e., the FSA field 310) in the header 306 of the outbound slot 304, which is used to indicate future slot assignments to the assigned subscriber unit listed in the NSA field 308, subscriber units no longer need to decode all outbound slots to determine their inbound slot assignments. More importantly, a half duplex subscriber unit is now able to transmit on consecutive inbound slots, thus more effectively utilizing the inbound channel 302, all with minimal signaling.

It should be noted that in the preferred embodiment, the present invention utilizes a storage medium having stored thereon a set of instructions which, when loaded into a microprocessor, causes the microprocessor to perform the details of the present invention as described above. It should be obvious to those skilled in the art, however, that the present invention may be implemented in hardware or software.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising the steps of:
    identifying in an outbound slot an address of a subscriber unit assigned to transmit in a corresponding inbound slot; and
    identifying with one bit in the outbound slot an additional inbound slot the subscriber unit is assigned to transmit in, wherein the additional inbound slot follows the corresponding inbound slot, and wherein the steps of identifying occur in a slot header of an outbound slot.

2. The method of claim 1 wherein the steps of identifying are repeated in each outbound slot present in an outbound transmission.

3. The method of claim 1 further comprising the step of identifying a plurality of bits which identify a plurality of additional inbound slots the subscriber unit is assigned to transmit in, wherein the plurality of additional inbound slots follow the corresponding inbound slot and wherein a single bit in the plurality of bits corresponds to a single inbound slot in the plurality of additional inbound slots.

4. The method of claim 1 further comprising the step of identifying with one bit in the outbound slot an inbound slot the subscriber unit is not assigned to transmit in, wherein the inbound slot follows the corresponding inbound slot.

5. The method of claim 1 further comprising the step of identifying a plurality of bits which identify a plurality of additional inbound slots the subscriber unit is not assigned to transmit in, wherein the plurality of additional inbound slots follow the corresponding inbound slot and wherein a single bit in the plurality of bits corresponds to a single inbound slot in the plurality of additional inbound slots.

6. The method of claim 1 wherein the steps of identifying are performed in a time division multiplex system.

7. A method comprising the steps of:
    identifying in an outbound slot an address of a subscriber unit assigned to transmit in a corresponding inbound slot and
    identifying with one bit in the outbound slot a plurality of additional inbound slots the subscriber unit is assigned to transmit in, wherein the plurality of additional inbound slots follow the corresponding inbound slot.

8. The method of claim 7 wherein the steps of identifying are repeated in each outbound slot present in an outbound transmission.

9. The method of claim 7 further comprising the step of identifying a plurality of bits which identify a plurality of additional inbound slots the subscriber unit is assigned to transmit in, wherein the plurality of additional inbound slots follow the corresponding inbound slot and wherein a single bit in the plurality of bits corresponds to a single inbound slot in the plurality of additional inbound slots.

10. The method of claim 7 further comprising the step of identifying with one bit in the outbound slot an inbound slot the subscriber unit is not assigned to transmit in, wherein the inbound slot follows the corresponding inbound slot.

11. The method of claim 7 further comprising the step of identifying a plurality of bits which identify a plurality of additional inbound slots the subscriber unit is not assigned to transmit in, wherein the plurality of additional inbound slots follow the corresponding inbound slot and wherein a single bit in the plurality of bits corresponds to a single inbound slot in the plurality of additional inbound slots.

12. A method comprising the steps of:
    identifying in an outbound slot an address of a subscriber unit assigned to transmit in a corresponding inbound slot;
    identifying with one bit in the outbound slot an additional inbound slot the subscriber unit is assigned to transmit in, wherein the additional inbound slot follows the corresponding inbound slot, and
    identifying in the outbound slot a slot type,
    wherein the slot type is the same for the corresponding inbound slot and the additional inbound slot.

13. A method comprising the steps of:
    identifying in an outbound slot a random access address that allows at least one of a plurality of subscriber units to transmit in a corresponding inbound slot; and
    identifying with one bit in the outbound slot identifies a plurality of additional inbound slots in which at least one of the plurality of subscriber units are allowed to transmit in, wherein the plurality of additional inbound slots follow the corresponding inbound slot.

14. The method of claim 13 further comprising the step of identifying a plurality of bits which identify a plurality of additional inbound slots at least one of a plurality of subscribers may transmit in, wherein the plurality of additional inbound slots follow the corresponding inbound slot and wherein a single bit in the plurality of bits corresponds to a single inbound slot in the plurality of additional inbound slots.

15. The method of claim 13 further comprising the step of identifying with one bit in the outbound slot an inbound slot not assigned to the random access address.

16. A method comprising the steps of:
    identifying in an outbound slot a random access address that allows at least one of a plurality of subscriber units to transmit in a corresponding inbound slot;
    identifying with one bit in the outbound slot an additional inbound slot at least one of the plurality of subscriber units are allowed to transmit in, wherein the additional inbound slot follows the corresponding inbound slot; and
    identifying in the outbound slot a slot type,
    wherein the slot type is the same for the corresponding inbound slot and the additional inbound slot.

17. A method comprising the steps of:
    identifying in an outbound slot a quiet address that prevents all subscriber units from transmitting in a corresponding inbound slot; and
    identifying with one bit in the outbound slot identifies a plurality of additional inbound slots in which all subscriber units are prevented from transmitting in, wherein the plurality of additional inbound slots follow the corresponding inbound slot.

18. The method of claim 17 further comprising the step of identifying a plurality of bits which identify a plurality of additional inbound slots in which all subscriber units are prevented from transmitting in, wherein the plurality of additional inbound slots follow the corresponding inbound slot and wherein a single bit in the plurality of bits corresponds to a single inbound slot in the plurality of additional inbound slots.

19. The method of claim 17 further comprising the step of identifying with one bit in the outbound slot an inbound slot not assigned to the quiet address.

20. A method comprising the steps of:
identifying in an outbound slot a quiet address that prevents all subscriber units from transmitting in a corresponding inbound slot;
identifying with one bit in the outbound slot an additional inbound slot in which all subscriber units are prevented from transmitting in, wherein the additional inbound slot follows the corresponding inbound slot;and
identifying in the outbound slot a slot type,
wherein the slot type is the same for the corresponding inbound slot and the additional inbound slot.

* * * * *